(12) United States Patent
Itten et al.

(10) Patent No.: US 12,451,795 B2
(45) Date of Patent: Oct. 21, 2025

(54) POWER CONVERTER, CHARGING POST AND VEHICLE

(71) Applicant: Bucher Hydraulics AG, Neuheim (CH)

(72) Inventors: Alex Itten, Romanshorn (CH); Dirk Schekulin, Gais (CH); Bernhard Laeng, Romanshorn (CH); Christof Schneggenburger, Guettingen (CH); Benjamin Faessler, Waldstatt (CH)

(73) Assignee: Bucher Hydraulics AG, Neuheim (CH)

( * ) Notice: Subject to any disclaimer, the term of this patent is extended or adjusted under 35 U.S.C. 154(b) by 657 days.

(21) Appl. No.: 17/794,695

(22) PCT Filed: Jan. 22, 2021

(86) PCT No.: PCT/EP2021/051475
§ 371 (c)(1),
(2) Date: Jul. 22, 2022

(87) PCT Pub. No.: WO2021/148617
PCT Pub. Date: Jul. 29, 2021

(65) Prior Publication Data
US 2023/0058430 A1    Feb. 23, 2023

(30) Foreign Application Priority Data
Jan. 24, 2020 (DE) .................... 10 2020 200 872.8

(51) Int. Cl.
*H02M 1/08* (2006.01)
*B60L 53/10* (2019.01)
(Continued)

(52) U.S. Cl.
CPC ............... *H02M 1/08* (2013.01); *B60L 53/10* (2019.02); *H02M 1/0009* (2021.05);
(Continued)

(58) Field of Classification Search
USPC .......................................................... 320/109
See application file for complete search history.

(56) References Cited

U.S. PATENT DOCUMENTS

| | | |
|---|---|---|
| 5,060,129 A | 10/1991 | Maruyama |
| 9,042,131 B2 | 5/2015 | Barron et al. |

(Continued)

FOREIGN PATENT DOCUMENTS

| | | |
|---|---|---|
| CN | 104578865 A | 4/2015 |
| CN | 109193559 A | 1/2019 |

(Continued)

OTHER PUBLICATIONS

German-language European Office Action issued in European Application No. 21 701 525.4 dated Jan. 5, 2024 (7 pages).
(Continued)

*Primary Examiner* — Bryce M Aisaka
(74) *Attorney, Agent, or Firm* — Crowell & Moring LLP

(57) ABSTRACT

A power converter, includes: a first terminal, a second terminal, a third terminal and a fourth terminal; stored-energy-source terminals, to which a stored energy source can be connected; four inverter bridge branches, which are formed from semiconductor switching devices, the inverter bridge branches each having a center tap, each center tap being assigned to one of the terminals, and the inverter bridge branches being interconnected and controllable such that electrical energy can be transferred bidirectionally between the stored-energy-source terminals and the first terminal, the second terminal, the third terminal and/or the fourth terminal; and a control unit, which is designed to control the semiconductor switching devices of the inverter bridge branches.

16 Claims, 7 Drawing Sheets

(51) Int. Cl.
    *H02M 1/00*         (2006.01)
    *H02M 1/12*         (2006.01)
    *H02M 7/487*       (2007.01)

(52) U.S. Cl.
    CPC .......... *H02M 1/126* (2013.01); *H02M 7/487* (2013.01); *H02J 2207/20* (2020.01)

(56) References Cited

U.S. PATENT DOCUMENTS

| | | | |
|---|---|---|---|
| 9,520,764 | B1 * | 12/2016 | Bundschuh ............ H02M 1/08 |
| 2001/0048604 | A1 | 12/2001 | Oka et al. |
| 2004/0085046 | A1 | 5/2004 | Ye et al. |
| 2009/0016089 | A1 | 1/2009 | Nguyen |
| 2013/0286692 | A1 | 10/2013 | Patel et al. |
| 2014/0334213 | A1 | 11/2014 | Jussila et al. |
| 2016/0172976 | A1 | 6/2016 | Mu et al. |
| 2018/0026568 | A1 | 1/2018 | Huang |
| 2018/0287601 | A1 | 10/2018 | Yang et al. |
| 2018/0351368 | A1 | 12/2018 | Sun et al. |
| 2019/0181774 | A1 | 6/2019 | Liu et al. |
| 2019/0229643 | A1 | 7/2019 | Bax et al. |
| 2020/0307406 | A1 | 10/2020 | Stentenbach |
| 2022/0169131 | A1 | 6/2022 | Galin et al. |

FOREIGN PATENT DOCUMENTS

| | | |
|---|---|---|
| DE | 101 16 474 A1 | 10/2001 |
| DE | 10 2011 101 191 A1 | 11/2012 |
| DE | 10 2017 128 573 B3 | 1/2019 |
| EP | 0 451 440 A2 | 10/1991 |
| EP | 2 367 272 A2 | 9/2011 |
| EP | 2 660 962 A2 | 11/2013 |
| EP | 2 802 054 A1 | 11/2014 |
| EP | 3 351 422 A1 | 7/2018 |
| EP | 3 496 257 A1 | 6/2019 |
| EP | 3 514 940 A1 | 7/2019 |
| WO | WO 2019/072634 A | 4/2019 |

OTHER PUBLICATIONS

Wojciechowski, D., "High Power Grid Interfacing Ac-Dc Pwm Converters with Power Conditioning Capabilities", 38th Annual Conference on IEEE Industrial Electronics Society, IEEE, Oct. 25, 2012, pp. 5191-5196, XP032281313 (6 pages).

López, I. et al., "Modulation Strategy for Multiphase Neutral-Point-Clamped Converters", IEEE Transactions on Power Electronics, Institute of Electrical and Electronics Engineers, Feb. 1, 2016, pp. 928-941, vol. 31, No. 2, XP011670458 (14 pages).

International Search Report (PCT/ISA/210) issued in PCT Application No. PCT/EP2021/051475 dated Apr. 16, 2021 with English translation (six (6) pages).

German-language Written Opinion (PCT/ISA/237) issued in PCT Application No. PCT/EP2021/051475 dated Apr. 16, 2021 (eight (8) pages).

* cited by examiner

POWER CONVERTER, CHARGING POST AND VEHICLE

BACKGROUND AND SUMMARY

The invention relates to a power converter, to a charging post and to a vehicle.

The invention is based on the object of providing a power converter, a charging post and a vehicle which can be used as flexibly as possible.

The power converter has a first connection, a second connection, a third connection and a fourth connection, wherein external DC or AC voltage loads or external DC or AC voltage sources can be connected to these connections, for example.

The power converter also has energy store connections, for example two or three energy store connections, to which one or more energy stores and/or an intermediate circuit can be connected.

The power converter also has precisely four inverter bridge branches. A respective inverter bridge branch is formed from semiconductor switching devices, for example two or four semiconductor switching devices, for example in the form of IGBTs. A respective inverter bridge branch has a center tap which is assigned to one of the connections, in particular by interposing a filter, in particular is connected directly to the assigned connection in an electrically conductive manner or is connected in an electrically conductive manner via interposed electrical components. The center tap of the first inverter bridge branch may be assigned, for example, to the first connection, the center tap of the second inverter bridge branch may be assigned to the second connection, the center tap of the third inverter bridge branch may be assigned to the third connection and the center tap of the fourth inverter bridge branch may be assigned to the fourth connection. The inverter bridge branches are connected and can be controlled in such a manner that electrical energy can be transmitted bidirectionally between the energy store connections and the first connection, the second connection, the third connection and/or the fourth connection.

The power converter also has a control unit, for example in the form of a microprocessor, which is designed to control the semiconductor switching devices of the inverter bridge branches on the basis of an operating mode.

According to one embodiment, the control unit is designed, in a first operating mode, to control the semiconductor switching devices of the inverter bridge branches in such a manner that one connection of the four connections forms a neutral conductor of an AC voltage grid and the three other connections of the four connections form phase conductors of the AC voltage grid. The voltages generated by the AC voltage grid are preferably each sinusoidal and have a low harmonic component. An all-pole disconnecting apparatus (contactor) may be provided for safety reasons.

In the first operating mode, energy can flow from the electrical energy store in the direction of the first, second, third and/or fourth connection, wherein, on account of the use of the neutral conductor, it is possible to supply electrical loads with a 230 V connection or 3 X 400 V connection. Alternatively, energy can flow from the first, second, third and/or fourth connection in the direction of the electrical energy store, with the result that a so-called on-board charger (OBC) can be implemented by means of the power converter.

According to one embodiment, the control unit is designed, in a second operating mode, to control the semiconductor switching devices of the inverter bridge branches in such a manner that three connections of the four connections form a three-phase grid without a neutral conductor. The second operating mode is also referred to as an active front end (AFE) inverter and makes it possible to exchange energy between the three-phase grid or integrated grid and the energy store or a DC voltage intermediate circuit in both directions According to one embodiment, the AC voltage grid and/or the three-phase grid is/are an (Isolé Terre) IT grid or a (Terre Neutre) TN grid.

According to one embodiment, the control unit is designed, in a third operating mode, to control the semiconductor switching devices of the inverter bridge branches in such a manner that a first DC voltage is output between a first connection of the four connections and a second connection of the four connections and a second DC voltage is output between a third connection of the four connections and a fourth connection of the four connections. The inverter bridge branches consequently operate as a bidirectional, in particular symmetrical, DC/DC converter and therefore make it possible to exchange energy between two or three DC circuits.

According to one embodiment, the control unit is designed, in a fourth operating mode, to control the semiconductor switching devices of the inverter bridge branches in such a manner that a first potential is output at a first connection of the four connections and at a second connection of the four connections and a second potential is output at a third connection of the four connections and at a fourth connection of the four connections. The inverter bridge branches consequently operate as a DC/DC converter, wherein two DC/DC converters are connected in parallel.

According to one embodiment, the inverter bridge branches form a four-phase inverter, wherein the inverter bridge branches are fed from a positive intermediate circuit potential and a negative intermediate circuit potential.

The inverter bridge branches may form four half-bridges in a three-level topology. The inverter bridge branches may be designed, for example, in a neutral point clamped (NPC) topology, an active neutral point clamped (ANPC) topology or a mixed voltage neutral point (MNPC) topology. With respect to the fundamental topology and function of three-level inverters, reference shall also be made to the relevant technical literature, for example to EP 0 451 440 A2, in particular FIG. 2 there, which shows a three-phase three-level inverter.

According to one embodiment, the control unit is designed, in the first operating mode, to control the semiconductor switching devices of the inverter bridge branches in such a manner that a potential in the region of a center potential is output at that connection of the four connections which forms the neutral conductor of the AC voltage grid, wherein the center potential is between the positive intermediate circuit potential and the negative intermediate circuit potential. For example, a potential which is in a range of ±50 V around the center potential can be output at that connection of the four connections which forms the neutral conductor of the AC voltage grid. In particular, the control unit is designed, in the first, second, third or fourth operating mode, to control the semiconductor switching devices of the inverter bridge branches in such a manner that the center potential is between the positive intermediate circuit potential and the negative intermediate circuit potential in such a manner that the permissible voltage ranges of the components used are complied with.

According to one embodiment, the control unit is designed to control the semiconductor switching devices of the inverter bridge branches in such a manner that voltages which are output between the first connection, the second connection, the third connection and/or the fourth connection are symmetrical with respect to the center potential. The control unit may be designed, in the third operating mode, to control the semiconductor switching devices of the inverter bridge branches in such a manner that the first DC voltage and the second DC voltage are generated in a symmetrical manner with respect to the center potential, that is to say the center potential is in the center of the two DC voltages.

According to one embodiment, the power converter has a filter, in particular a filter having a plurality of filter branches, which filter or the filter branches of which is/are looped in between the center taps of the respective inverter bridge branches and the first connection, the second connection, the third connection and the fourth connection. The filter may be, for example, a quadruple LCL filter.

According to one embodiment, the filter has four filter capacitors, for example, which are each connected to the center potential by one of their connections.

According to one embodiment, the filter has those filter capacitors which are each connected to a first energy store connection of the energy store connections by one of their connections and/or those filter capacitors which are each connected to a second energy store connection of the energy store connections by one of their connections.

According to one embodiment, the power converter has, for each inverter bridge branch, an output current sensor, wherein a respective output current sensor is coupled to the control unit for the purpose of interchanging data. A respective output current sensor is designed to measure an associated output current of the power converter. The control unit is designed to carry out current control and/or voltage control on the basis of the measured output currents.

According to one embodiment, the power converter has, for each filter capacitor, a filter current sensor, wherein a respective filter current sensor is coupled to the control unit for the purpose of interchanging data. A respective filter current sensor is designed to measure an associated filter current in the filter capacitor associated with it. The control unit is designed to carry out current control and/or voltage control on the basis of the measured filter currents.

According to one embodiment, the control unit is designed to determine a current load of the inverter bridge branches on the basis of the measured output currents and the measured filter currents and to control the inverter bridge branches on the basis thereof, for example to balance them around the current load.

The charging post according to the invention has an energy store, in particular an electrical energy store, and a power converter described above, wherein the energy store is connected to the energy store connections of the power converter. The energy store may be, for example, a battery, a fuel cell, one or more double-layer capacitors (etc.). The power converter is designed, in particular, to generate suitable DC and/or AC voltages for charging an electric vehicle at its first connection, its second connection, its third connection and/or its fourth connection.

The vehicle according to the invention has an energy store, in particular an electrical energy store, and a power converter described above, wherein the energy store is connected to the energy store connections of the power converter. The energy store may be, for example, a battery, a fuel cell, one or more double-layer capacitors (etc.). The power converter is designed, in particular, to receive electrical energy for charging the energy store via its first connection, its second connection, its third connection and/or its fourth connection. For this purpose, a suitable DC or AC voltage source, which provides external electrical energy for charging the energy store, may be connected to the first connection, the second connection, the third connection and/or the fourth connection.

The invention is described in detail below with reference to the drawings.

DETAILED DESCRIPTION OF THE DRAWINGS

Figure 1:
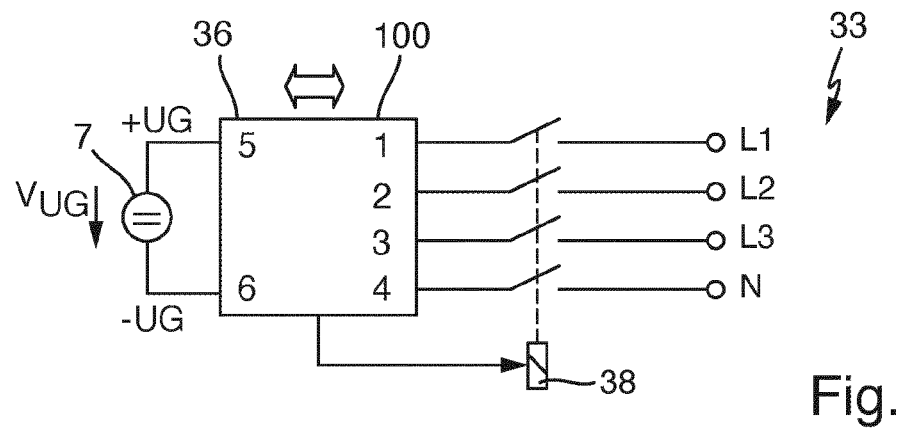
FIG. 1 shows a power converter according to an embodiment of the invention in a first operating mode.

A basic internal structure of the power converter 100 is first of all described below with reference to FIG. 6.

The power converter 100 has a first connection 1, a second connection 2, a third connection 3 and a fourth connection 4, to which various external components in different operating modes can be connected. This is discussed in more detail below.

The power converter 100 has a first energy store connection 5 and a second energy store connection 6, to which an energy store 7, for example a battery, can be connected, also see FIG. 1, for example, in this respect. A positive intermediate circuit potential ZK+ is present at the first energy store connection 5 and a negative intermediate circuit potential ZK− is present at the second energy store connection 6. The positive intermediate circuit potential ZK+ may correspond to a positive energy store potential UG+ and the negative intermediate circuit potential ZK− may correspond to a negative energy store potential UG−, see FIG. 1, for example.

The power converter 100 also has two capacitors 39 and 40 which are looped in in series between the energy store connections 5 and 6. A center potential ZKM is present at a node connecting the two capacitors 39 and 40.

The power converter 100 also has precisely four inverter bridge branches 24, 25, 26 and 27, the internal structure of which is described in detail with reference to FIGS. 7, 8 and 9.

The inverter bridge branches 24, 25, 26, 27 have a center tap 28, 29, 30 and 31, respectively, wherein a center tap 28, 29, 30 and 31 is assigned to a connection 1, 2, 3 and 4, respectively, with the interposition of an optional quadruple LCL sinusoidal filter 37.

The LCL filter 37 has, for an associated inverter bridge branch 24, 25, 26 and 27, a first coil 51, 52, 53 and 54, a filter capacitor 55, 56, 57 and 58 and a second coil 63, 64, 65 and 66, respectively, in the illustrated LCL topology.

A filter current sensor 59, 60, 61 and 62, which measures a filter current in the associated filter capacitor 59, 60, 61 and 62, respectively, is also arranged in a filter branch.

An output current sensor 67, 68, 69 and 70, respectively, is also arranged in a filter branch and measures an output current in the associated filter branch.

The components of the filter 37 may be completely or partially water-cooled.

The filter capacitors 55, 56, 57, 58 are each connected to the center potential ZKM by one of their connections via the filter current sensors 59, 60, 61 and 62, respectively.

Figure 12:
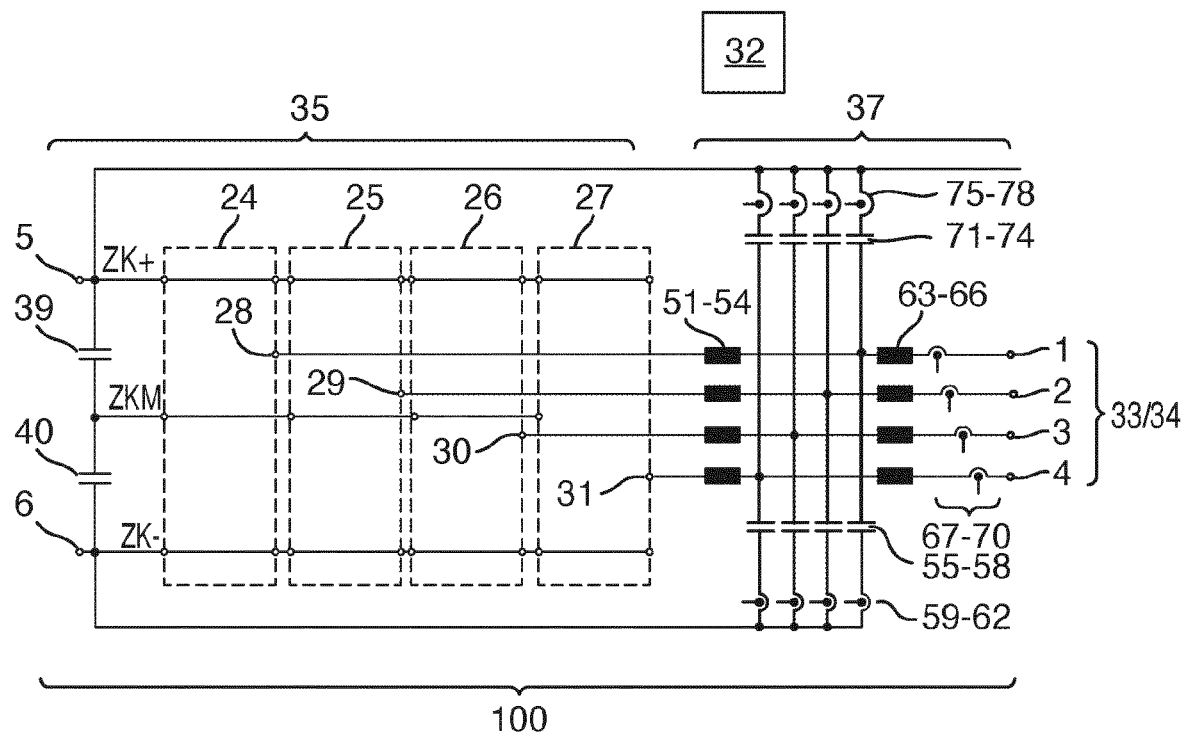
FIG. 12 shows a circuit diagram of a basic structure of a power converter according to a further embodiment.

As shown in FIG. 12, the filter capacitors 55, 56, 57, 58 may alternatively each be connected to the second energy store connection 6 by one of their connections via the filter current sensors 59, 60, 61 and 62, respectively, and filter capacitors 71, 72, 73, 74 may each be connected to the first energy store connection 5 by one of their connections via filter current sensors 75, 76, 77 and 78, respectively.

Figure 13:
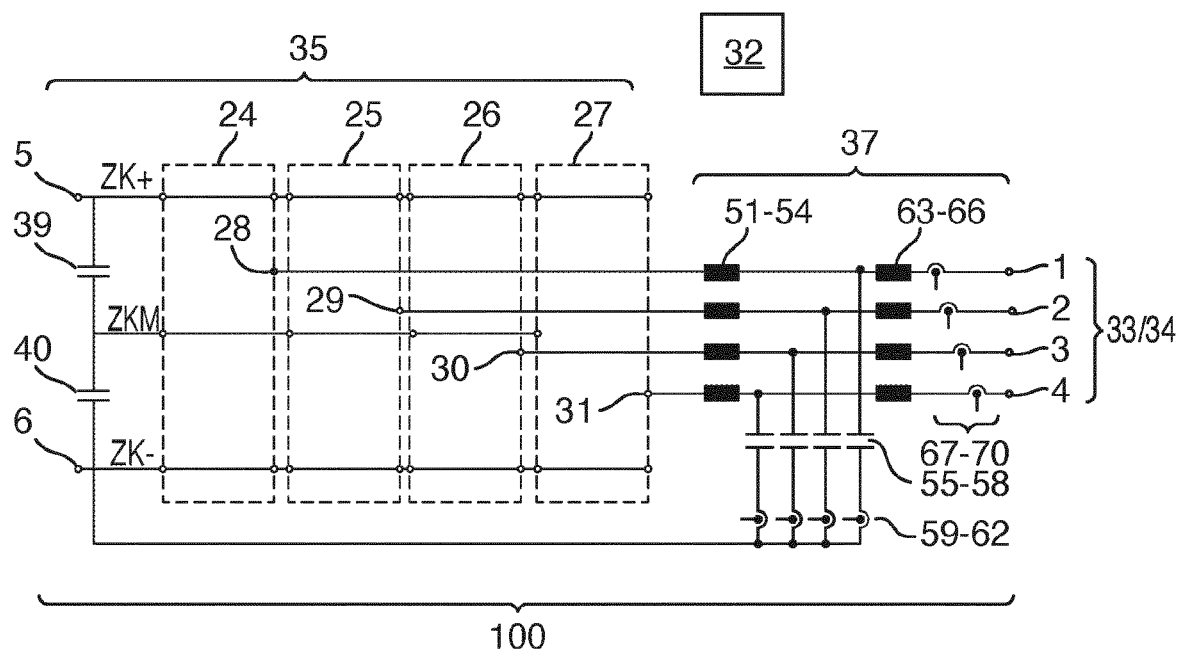
FIG. 13 shows a circuit diagram of a basic structure of a power converter according to a further embodiment.

As shown in FIG. 13, the filter capacitors 55, 56, 57, 58 may further alternatively each be connected to the second energy store connection 6 by one of their connections via the filter current sensors 59, 60, 61 and 62, respectively. In an alternative which is not illustrated, the filter capacitors 55, 56, 57, 58 may each be connected to the first energy store connection 5 by one of their connections via the filter current sensors 59, 60, 61 and 62, respectively.

Figure 14:
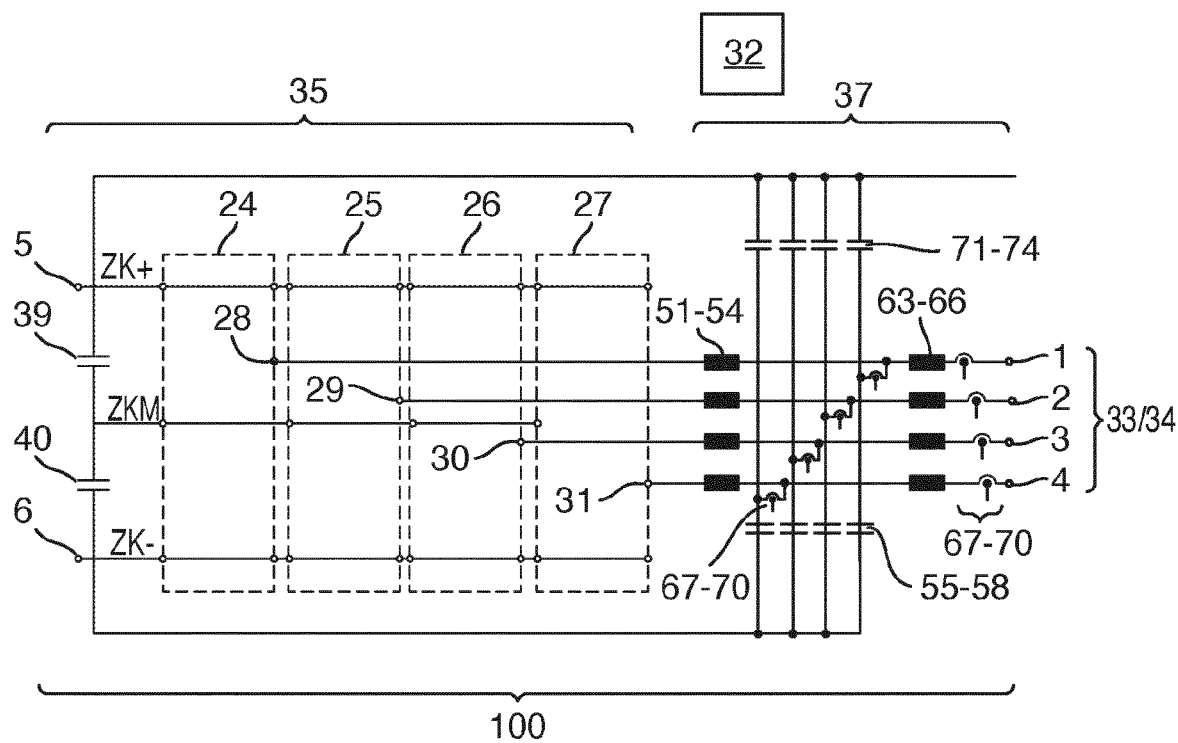
FIG. 14 shows a circuit diagram of a basic structure of a power converter according to a further embodiment.

As shown in FIG. 14, the filter capacitors 55, 56, 57, 58 may further alternatively each be connected to the second energy store connection 6 by one of their connections and the filter capacitors 71, 72, 73, 74 may each be connected to the first energy store connection 5 by one of their connections. A node connecting the filter capacitors 55, 56, 57, 58 to the associated filter capacitors 71, 72, 73, 74 is connected, for this situation, to a node connecting the coils 51, 52, 53, 54 to the associated coils 63, 64, 65, 66 via the associated filter current sensors 59, 60, 61 and 62, respectively. The power converter 100 also has a control unit 32 which is designed to control semiconductor switching devices (see FIGS. 7 to 9) of the inverter bridge branches 24, 25, 26, 27 in such a manner that electrical energy can be transmitted bidirectionally between the energy store connections 5, 6 and the first connection 1, the second connection 2, the third connection 3 and/or the fourth connection. The control unit 32 is coupled to the current sensors 59 to 62, 67 to 70 and possibly 75 to 78 for the purpose of interchanging data. The control unit 32 carries out current control and/or voltage control on the basis of the measured currents.

Figure 6:
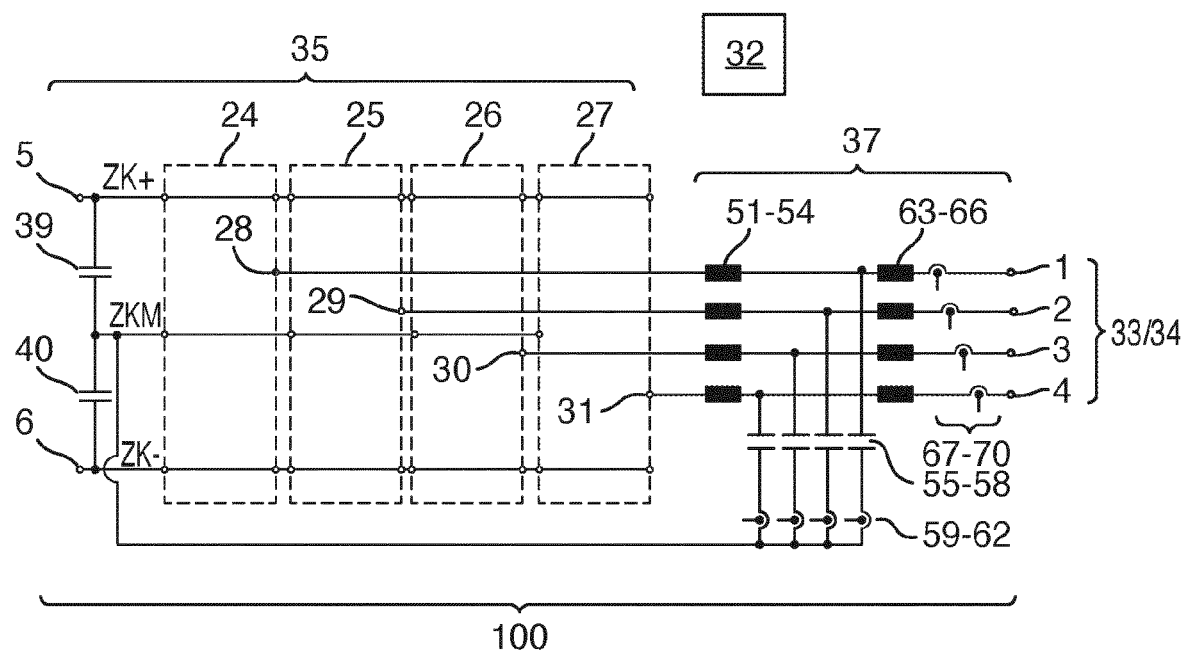
FIG. 6 shows a circuit diagram of a basic structure of the power converter.
Figure 7:
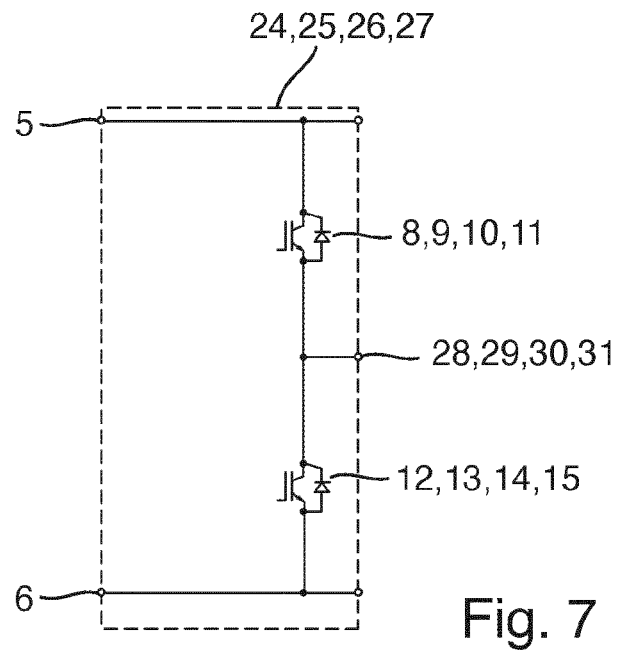
FIG. 7 shows a circuit diagram of an inverter bridge branch of the power converter shown in FIG. 6 according to a first embodiment.

FIG. 7 shows a circuit diagram of an inverter bridge branch 24, 25, 26 and 27 of the power converter 100 shown in FIG. 6 according to a first embodiment. The inverter bridge branch 24 has two semiconductor switching devices 8 and 12 looped in in series between the energy store connections 5 and 6.

The inverter bridge branches 25 to 27 have a corresponding structure and have semiconductor switching devices 9 and 13; 10 and 14; and 11 and 15, respectively. A freewheeling diode is connected in parallel with each of the semiconductor switching devices 8 to 15.

A node connecting the semiconductor switching device 8 and the semiconductor switching device 12 forms the center tap 28 and is connected to an associated filter branch of the filter 37.

In a corresponding manner, a node connecting the semiconductor switching device 9 and the semiconductor switching device 13 forms a center tap 29 and is connected to an associated filter branch of the filter 37.

In a corresponding manner, a node connecting the semiconductor switching device 10 and the semiconductor switching device 14 forms the center tap 30 and is connected to an associated filter branch of the filter 37.

In a corresponding manner, a node connecting the semiconductor switching device 11 and the semiconductor switching device 15 forms the center tap 31 and is connected to an associated filter branch of the filter 37.

Figure 8:
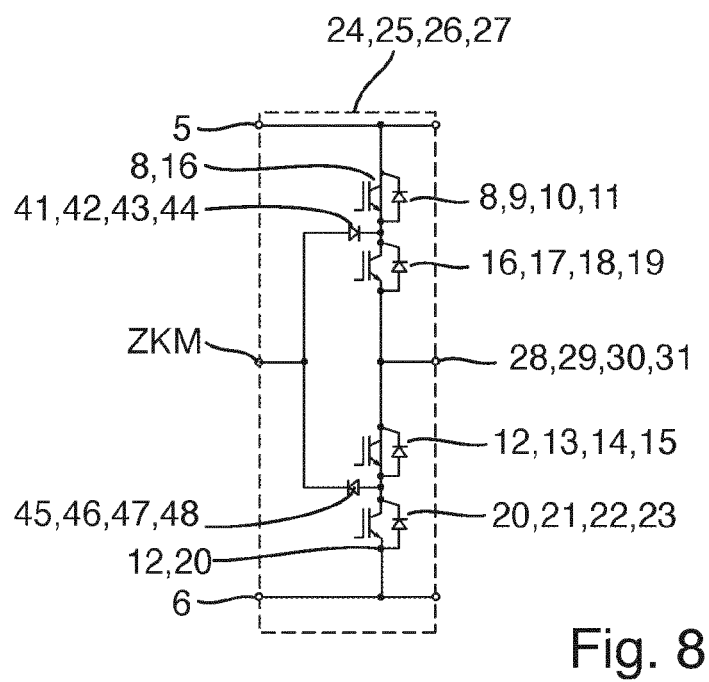
FIG. 8 shows a circuit diagram of an inverter bridge branch of the power converter shown in FIG. 6 according to a further embodiment.

FIG. 8 shows a circuit diagram of a three-level inverter bridge branch 24, 25, 26 and 27 of the power converter 100 shown in FIG. 6 according to a further embodiment.

The inverter bridge branch 24 has four semiconductor switching devices 8, 16, 12, 20 looped in in series between the energy store connections 5 and 6. The inverter bridge branch 24 also has a first diode 41, the anode of which is connected to the node connecting the two capacitors 39 and 40 and the cathode of which is connected to a node connecting the semiconductor switching device 8 and the semiconductor switching device 16. The inverter bridge branch 24 also has a second diode 45, the cathode of which is connected to the node connecting the two capacitors 39 and 40 and the anode of which is connected to a node connecting the semiconductor switching device 12 and the semiconductor switching device 20. The center tap 28 in the form of the node connecting the semiconductor switching device 16 and the semiconductor switching device 12 is connected to an associated filter branch of the filter 37.

The inverter bridge branch 25 correspondingly has four semiconductor switching devices 9, 17, 13, 21 looped in in series between the energy store connections 5 and 6. The inverter bridge branch 25 also has a first diode 42, the anode of which is connected to the node connecting the two capacitors 39 and 40 and the cathode of which is connected to a node connecting the semiconductor switching device 9 and the semiconductor switching device 17. The inverter bridge branch 25 also has a second diode 46, the cathode of which is connected to the node connecting the two capacitors 39 and 40 and the anode of which is connected to a node connecting the semiconductor switching device 13 and the semiconductor switching device 21. The center tap 29 in the form of the node connecting the semiconductor switching device 17 and the semiconductor switching device 13 is connected to an associated filter branch of the filter 37.

The inverter bridge branch 26 correspondingly has four semiconductor switching devices 10, 18, 14, 22 looped in in series between the energy store connections 5 and 6. The inverter bridge branch 26 also has a first diode 43, the anode of which is connected to the node connecting the two capacitors 39 and 40 and the cathode of which is connected to a node connecting the semiconductor switching device 10 and the semiconductor switching device 18. The inverter bridge branch 26 also has a second diode 47, the cathode of which is connected to the node connecting the two capacitors 39 and 40 and the anode of which is connected to the node connecting the semiconductor switching device 14 and the semiconductor switching device 22. The center tap 30 in the form of the node connecting the semiconductor switching device 18 and the semiconductor switching device 14 is connected to an associated filter branch of the filter 37.

The inverter bridge branch 27 correspondingly has four semiconductor switching devices 11, 19, 15, 23 looped in in series between the energy store connections 5 and 6. The inverter bridge branch 27 also has a first diode 44, the anode of which is connected to the node connecting the two capacitors 39 and 40 and the cathode of which is connected to a node connecting the semiconductor switching device 11 and the semiconductor switching device 19. The inverter bridge branch 27 also has a second diode 48, the cathode of which is connected to the node connecting the two capacitors 39 and 40 and the anode of which is connected to a node connecting the semiconductor switching device 15 and the semiconductor switching device 23. The center tap 31 in the form of the node connecting the semiconductor switching device 19 and the semiconductor switching device 15 is connected to an associated filter branch of the filter 37.

Figure 9:
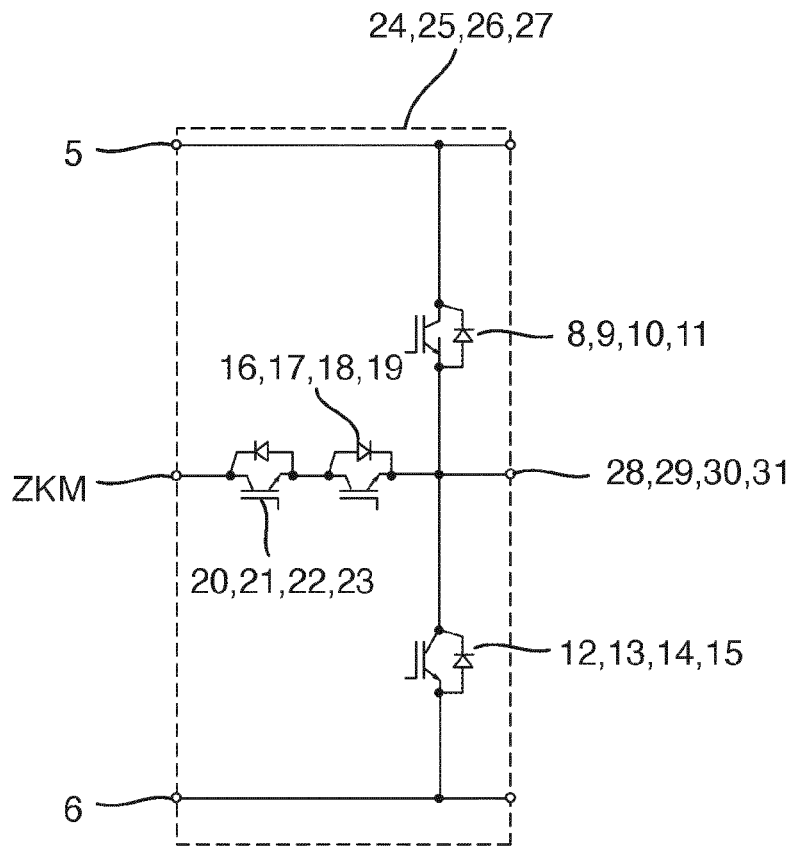
FIG. 9 shows a circuit diagram of an inverter bridge branch of the power converter shown in FIG. 6 according to a further embodiment.

FIG. 9 shows a circuit diagram of a three-level inverter bridge branch 24, 25, 26 and 27 of the power converter 100 shown in FIG. 6 according to a further embodiment.

The inverter bridge branch 24 has two semiconductor switching devices 8 and 12 looped in in series between the energy store connections 5 and 6. A node connecting the semiconductor switching device 8 and the semiconductor switching device 12 forms the center tap 28 and is connected to an associated filter branch of the filter 37. Semiconductor switching devices 16 and 20 are looped in in series between the center potential ZKM and the center tap 28. A freewheeling diode is connected in parallel with the semiconductor switching device 16, wherein the cathode of the freewheeling diode is connected to the center tap 28. A freewheeling diode is connected in parallel with the semiconductor switching device 20, wherein the center potential ZKM is applied to the cathode of the freewheeling diode.

The inverter bridge branch 25 correspondingly has two semiconductor switching devices 9 and 13 looped in in series between the energy store connections 5 and 6. A node connecting the semiconductor switching device 9 and the semiconductor switching device 13 forms the center tap 29 and is connected to an associated filter branch of the filter 37. Semiconductor switching devices 17 and 21 are looped in in series between the center potential ZKM and the center tap 29. A freewheeling diode is connected in parallel with the semiconductor switching device 17, wherein the cathode of the freewheeling diode is connected to the center tap 29. A freewheeling diode is connected in parallel with the semiconductor switching device 21, wherein the center potential ZKM is applied to the cathode of the freewheeling diode.

The inverter bridge branch 26 correspondingly has two semiconductor switching devices 10 and 14 looped in in series between the energy store connections 5 and 6. A node connecting the semiconductor switching device 10 and the semiconductor switching device 14 forms the center tap 30 and is connected to an associated filter branch of the filter 37. Semiconductor switching devices 18 and 22 are looped in in series between the center potential ZKM and the center tap 30. A freewheeling diode is connected in parallel with the semiconductor switching device 18, wherein the cathode of the freewheeling diode is connected to the center tap 30. A freewheeling diode is connected in parallel with the semi-conductor switching device 22, wherein the center potential ZKM is applied to the cathode of the freewheeling diode.

The inverter bridge branch 27 correspondingly has two semiconductor switching devices 11 and 15 looped in in series between the energy store connections 5 and 6. A node connecting the semiconductor switching device 11 and the semiconductor switching device 15 forms the center tap 31 and is connected to an associated filter branch of the filter 37. Semiconductor switching devices 19 and 23 are looped in in series between the center potential ZKM and the center tap 31. A freewheeling diode is connected in parallel with the semiconductor switching device 19, wherein the cathode of the freewheeling diode is connected to the center tap 31. A freewheeling diode is connected in parallel with the semiconductor switching device 23, wherein the center potential ZKM is applied to the cathode of the freewheeling diode.

FIG. 1 shows the power converter 100 in a first operating mode, which is also referred to as an electric power takeoff (ePTO) or "socket". In the first operating mode, the control unit 32 controls the semiconductor switching devices 8-23 of the inverter bridge branches 24, 25, 26, 27 (for example as illustrated in FIG. 8) in such a manner that the connection 4 forms a neutral conductor N of an IT or TN AC voltage grid 33, at which the center potential ZKM is output, for instance, and the three other connections 1, 2, 3 form phase conductors L1, L2, L3 of the AC voltage grid 33. An optional all-pole contactor 38 is used for grid isolation.

The power converter 1 has a schematically illustrated housing 36.

Figure 2:
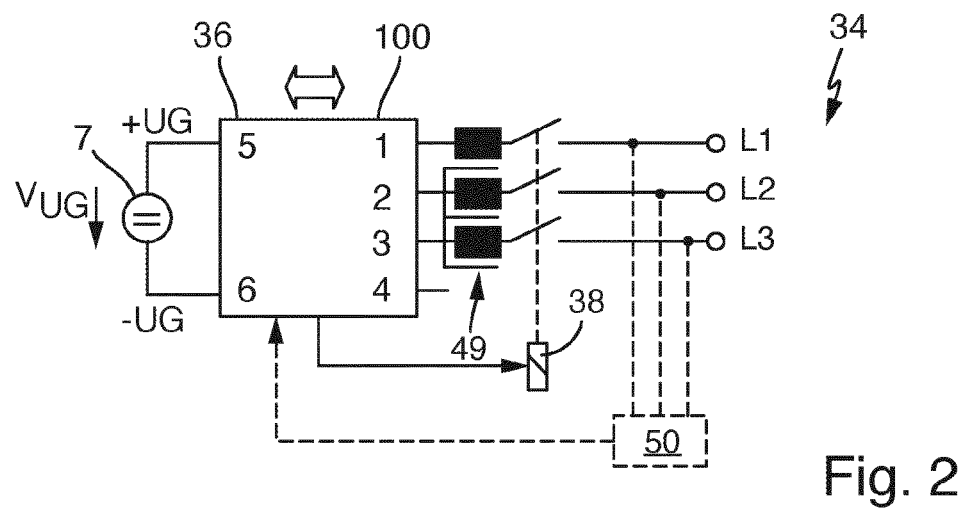
FIG. 2 shows the power converter in a second operating mode.

FIG. 2 shows the power converter 100 in a second operating mode. In the second operating mode, the control unit 32 controls the semiconductor switching devices 8-23 of the inverter bridge branches 24, 25, 26, 27 (for example as illustrated in FIG. 8) in such a manner that three connections 1, 2, 3 form a three-phase grid 34 without a neutral conductor. An all-pole contactor 38, a voltage measuring device 50 for measuring phase voltages and a three-phase grid choke 49 may optionally be provided.

Figure 3:
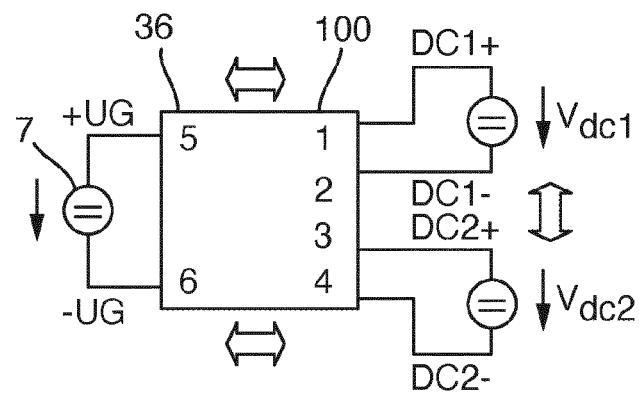
FIG. 3 shows the power converter in a third operating mode.

FIG. 3 shows the power converter 100 in a third operating mode. In the third operating mode, the control unit 32 controls the semiconductor switching devices 8-23 of the inverter bridge branches 24, 25, 26, 27 (for example as illustrated in FIG. 8) in such a manner that a first DC voltage Vdc1 is output between the first connection 1 and the second connection 2 and a second DC voltage Vdc2 is output between the third connection 3 and the fourth connection 4.

Figure 4:
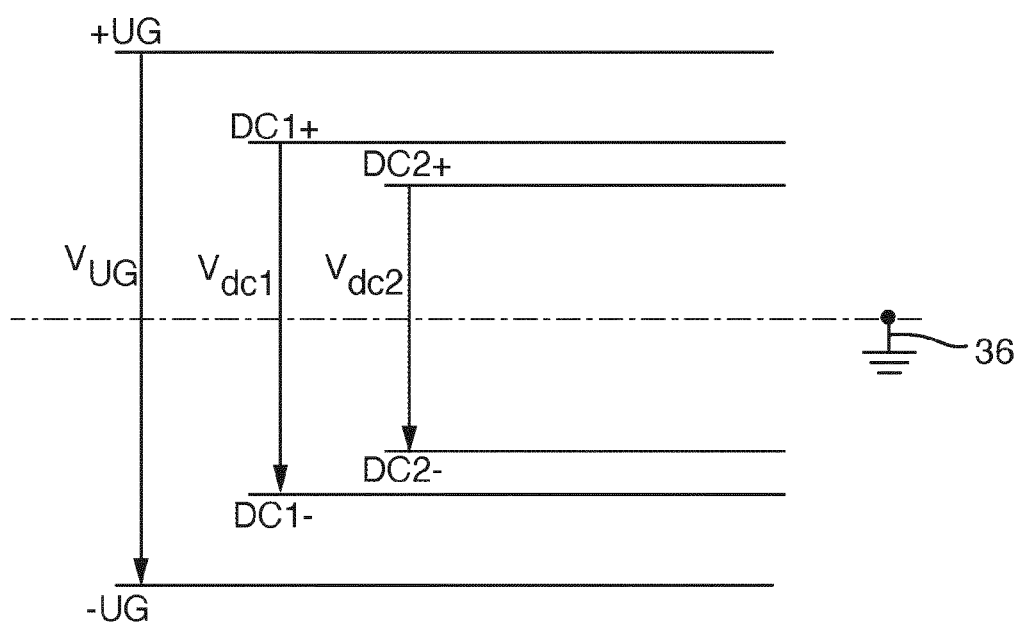
FIG. 4 shows voltage levels of voltages which are generated by the power converter in the third operating mode.

As is clear from FIG. 4, the first DC voltage Vdc1 and the second DC voltage Vdc2 are produced in a symmetrical manner with respect to the center potential ZKM.

Figure 5:
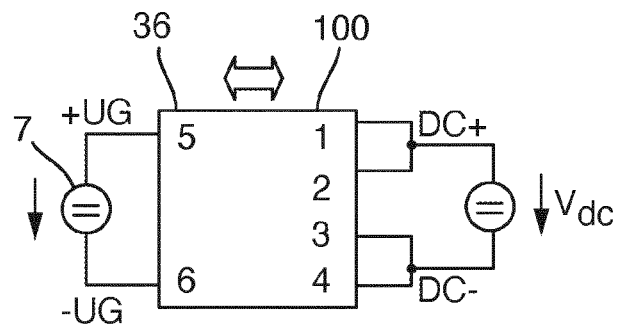
FIG. 5 shows the power converter in a fourth operating mode.

FIG. 5 shows the power converter 100 in a fourth operating mode. In the fourth operating mode, the control unit 32 controls the semiconductor switching devices 8-23 of the inverter bridge branches 24, 25, 26, 27 (for example as illustrated in FIG. 8) in such a manner that a first potential DC+ is output at the first connection 1 and at the second connection 2 and a second potential DC− is output at the third connection 3 and at the fourth connection 4.

Figure 10:
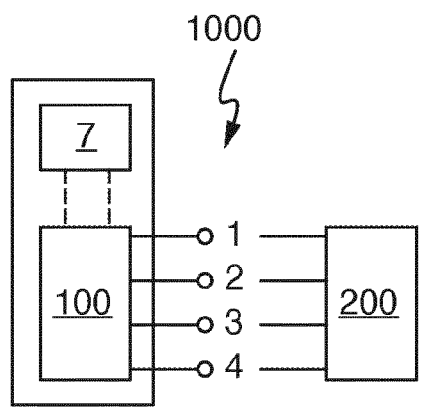
FIG. 10 shows, in a highly schematic manner, a charging post having a power converter.

FIG. 10 shows, in a highly schematic manner, a charging post 1000 having an energy store 7 and the power converter 100, wherein the energy store 7 is connected to the energy store connections 5, 6 of the power converter 100. The connections 1 to 4 of the power converter 100 are routed to the outside, with the result that energy stores of an electric vehicle 200 which need to be charged can be connected and charged there, for example.

Figure 11:
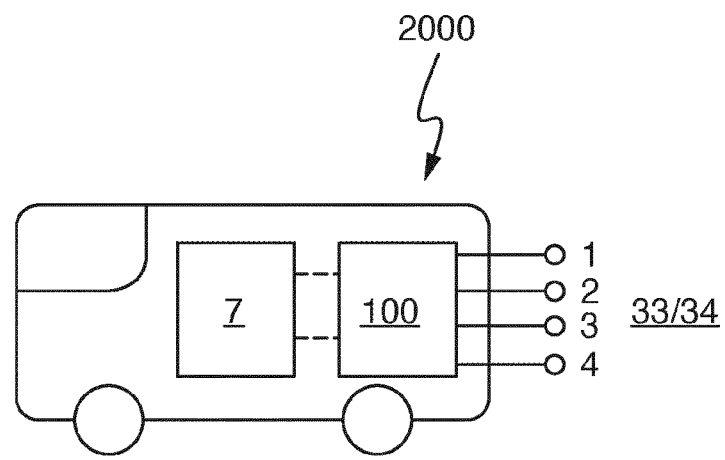
FIG. 11 shows, in a highly schematic manner, a vehicle having a power converter.

FIG. 11 shows, in a highly schematic manner, a vehicle 2000 having an energy store 7 and the power converter 100, wherein the energy store 7 is connected to the energy store connections 5, 6 of the power converter 100. The connections 1 to 4 of the power converter 100 are routed to the outside, with the result that energy stores to be charged can be connected there, for example, and/or external charging systems for charging the energy store 7 can be connected.

The expansion of the power converter from three to four output phases or inverter bridge branches, according to the invention, makes it possible to implement different operating modes, for example electric power takeoff (ePTO), on-board charger (OBC) and DC/DC converter, using only a single type of power converter and therefore to minimize development costs and manufacturing costs. The logistics costs and storage costs are also lower if only one device variant has to be produced.

The desired operating mode can be selected, for example, in a purely software-based manner, for example by means of a user setting on the power converter 100.

The following advantages arise from the approach according to the invention having four inverter bridge branches or four phases.

In the first operating mode with a neutral conductor having the same current-carrying capacity as the phases L1, L2 and L3, any unbalanced loads can be controlled and 230 V and 3×400 V loads can be supplied at the same time. In the OBC application, a ground conductor current can be reduced on account of the connected neutral conductor, thus enabling charging using a fault current circuit breaker (FI). Opposed neutral conductor currents can be generated and therefore fault currents on the ground conductor can be compensated for by suitably modulating the neutral conductor by suitably controlling the inverter bridge branches 24, 25, 26, 27.

The expansion to four output phases in the third and/or fourth operating mode means that all four phases can be used in the DC/DC converter and two different output voltages can therefore be generated at the same time or twice the output current can be achieved by means of the parallel connection.

The invention claimed is:

1. A power converter, comprising:
   a first connection, a second connection, a third connection and a fourth connection;
   energy store connections, to which an energy store is connectable;
   four inverter bridge branches formed from semiconductor switching devices;
   wherein the inverter bridge branches each have a center tap, wherein a respective center tap is assigned to one of the connections, and
   wherein the inverter bridge branches are connected and are controllable in such a manner that electrical energy is transmitted bidirectionally between the energy store connections and the first connection, the second connection, the third connection and/or the fourth connection; and
   a control unit designed to control the semiconductor switching devices of the inverter bridge branches, wherein
   the control unit is designed, in a first operating mode, to control the semiconductor switching devices of the inverter bridge branches in such a manner that one connection of the four connections forms a neutral conductor of an AC voltage grid and the three other connections of the four connections form phase conductors of the AC voltage grid.

2. The power converter according to claim 1, wherein the control unit is designed, in a second operating mode, to control the semiconductor switching devices of the inverter bridge branches in such a manner that three connections of the four connections form a three-phase grid without a neutral conductor.

3. The power converter according to claim 2, wherein the AC voltage grid and/or the three-phase grid is/are an IT (Isolé Terre) grid or a TN (Terre Neutre) grid.

4. The power converter according to claim 2, wherein the control unit is designed, in a third operating mode, to control the semiconductor switching devices of the inverter bridge branches in such a manner that a first DC voltage is output between a first connection of the four connections and a second connection of the four connections and a second DC voltage is output between a third connection of the four connections and a fourth connection of the four connections.

5. The power converter according to claim 4, wherein the control unit is designed, in a fourth operating mode, to control the semiconductor switching devices of the inverter bridge branches in such a manner that a first potential is output at a first connection of the four connections and at a second connection of the four connections and a second potential is output at a third connection of the four connections and at a fourth connection of the four connections.

6. A charging post, comprising:
   an energy store; and
   at least one power converter according to claim 1,
   wherein the energy store is connected to the energy store connections of the power converter, and
   wherein the power converter is designed to generate suitable voltages for charging an electric vehicle at its first connection, its second connection, its third connection and/or its fourth connection.

7. A vehicle, comprising:
   an energy store; and
   a power converter according to claim 1,
   wherein the energy store is connected to the energy store connections of the power converter, and
   wherein the power converter is designed to receive electrical energy for charging the energy store via its first connection, its second connection, its third connection and/or its fourth connection.

8. A power converter, comprising:
   a first connection, a second connection, a third connection and a fourth connection;
   energy store connections, to which an energy store is connectable;
   four inverter bridge branches formed from semiconductor switching devices;
   wherein the inverter bridge branches each have a center tap, wherein a respective center tap is assigned to one of the connections, and
   wherein the inverter bridge branches are connected and are controllable in such a manner that electrical energy is transmitted bidirectionally between the energy store connections and the first connection, the second connection, the third connection and/or the fourth connection; and
   a control unit designed to control the semiconductor switching devices of the inverter bridge branches, wherein
   the inverter bridge branches form a four-phase inverter, wherein the inverter bridge branches are fed from a positive intermediate circuit potential and a negative intermediate circuit potential.

9. The power converter according to claim 8, wherein the control unit is designed, in the first operating mode, to control the semiconductor switching devices of the inverter bridge branches in such a manner that a potential in the region of a center potential is output at that connection of the four connections which forms the neutral conductor of the AC voltage grid, wherein the center potential is between the positive intermediate circuit potential and the negative intermediate circuit potential.

10. The power converter according to claim 9, wherein the control unit is designed to control the semiconductor switching devices of the inverter bridge branches in such a manner that voltages which are output between the first connection, the second connection, the third connection and/or the fourth connection are symmetrical with respect to the center potential, wherein the control unit is designed to control the semiconductor switching devices of the inverter bridge branches in such a manner that a first DC voltage output between a first connection of the four connections and a second connection of the four connections and a second DC voltage output between a third connection of the four connections and a fourth connection of the four connections are generated in a symmetrical manner with respect to the center potential.

11. A power converter, comprising:
a first connection, a second connection, a third connection and a fourth connection;
energy store connections, to which an energy store is connectable;
four inverter bridge branches formed from semiconductor switching devices;
wherein the inverter bridge branches each have a center tap, wherein a respective center tap is assigned to one of the connections, and
wherein the inverter bridge branches are connected and are controllable in such a manner that electrical energy is transmitted bidirectionally between the energy store connections and the first connection, the second connection, the third connection and/or the fourth connection; and
a control unit designed to control the semiconductor switching devices of the inverter bridge branches, wherein
the power converter has a filter which is looped in between the center taps of the respective inverter bridge branches and the first connection, the second connection, the third connection and the fourth connection.

12. The power converter according to claim 11, wherein the filter has filter capacitors which are each connected to the center potential by one of their connections.

13. The power converter according to claim 12, wherein the power converter has filter current sensors which are coupled to the control unit for interchanging data and are designed to measure filter currents in the filter capacitors, wherein the control unit is designed to carry out current control and/or voltage control on the basis of the measured filter currents.

14. The power converter according to claim 13, wherein the control unit is designed to determine a current load of the inverter bridge branches on the basis of the measured output currents and the measured filter currents and to control the inverter bridge branches on the basis thereof.

15. The power converter according to claim 11, wherein
the filter has filter capacitors which are each connected to a second energy store connection of the energy store connections by one of their connections, and/or
the filter has filter capacitors which are each connected to a first energy store connection of the energy store connections by one of their connections.

16. A power converter, comprising:
a first connection, a second connection, a third connection and a fourth connection;
energy store connections, to which an energy store is connectable;
four inverter bridge branches formed from semiconductor switching devices;
wherein the inverter bridge branches each have a center tap, wherein a respective center tap is assigned to one of the connections, and
wherein the inverter bridge branches are connected and are controllable in such a manner that electrical energy is transmitted bidirectionally between the energy store connections and the first connection, the second connection, the third connection and/or the fourth connection; and
a control unit designed to control the semiconductor switching devices of the inverter bridge branches, wherein
the power converter has output current sensors which are coupled to the control unit for interchanging data and are designed to measure output currents of the power converter, wherein the control unit is designed to carry out current control and/or voltage control on the basis of the measured output currents.

* * * * *